Feb. 14, 1967   R. Y. H. H. BOLLAND   3,304,166
FLUID QUENCHING APPARATUS FOR PRODUCING A DIFFERENTIALLY
TOUGHENED ZONE IN A TOUGHENED GLASS
Filed Jan. 17, 1963   10 Sheets-Sheet 1

United States Patent Office 3,304,166
Patented Feb. 14, 1967

3,304,166
FLUID QUENCHING APPARATUS FOR PRODUCING A DIFFERENTIALLY TOUGHENED ZONE IN A TOUGHENED GLASS
Roger Yvonne Hubert Henri Bolland, Jemeppe-sur-Sambre, Belgium, assignor to Glaceries Reunies, Societe Anonyme, Jemeppe-sur-Sambre, Belgium
Filed Jan. 17, 1963, Ser. No. 252,182
Claims priority, application Belgium, Jan. 19, 1962, 612,835
2 Claims. (Cl. 65—273)

This invention relates to methods of producing in toughened glass a privileged zone, which, should the glass shatter, breaks into larger fragments than the rest of the glass so that, for instance, in the case of a windscreen or windshield adequate visibility is provided for the safety of the vehicle driver. This zone is called the "differentially toughened zone" and is of use in all kinds of toughened glass, for instance, motor vehicle windscreens.

The present invention provides a method of producing a differentially toughened zone in a pane of glass, the zone being adapted to shatter on impact into larger fragments than the remainder of the glass so that zone will still provide adequate transparency for safety. In this method, a pane of glass is subjected to a temperature change during which the heat transmission to or from a portion of the pane destined to become said zone is attenuated by a heat resistant screen disposed alongside the pane so that the rate of change of temperature of said portion is different from the remainder of the pane.

In a first method of carrying out the invention one or more screens made, for instance, of stainless steel or any other heat-resistant substance, and serving to prevent local heat radiation to the glass is or are introduced into a toughening furnace opposite the glass and near the place where the differentially toughened zone is required. If the screen is made of metal or of any other heat conductor, the screen also serves to remove some heat from the glass.

The preparation of a desired differential zone having relatively large fragmentation depends upon a number of factors, namely:

(a) the physical characteristics of the substance forming the screens such as the nature, heat conductivity and so on;
(b) distance of the screens from the glass; and
(c) the instant at which, and the period of time for which, the screens are placed at a particular distance from the glass during the total dwell time thereof in the furnace.

Glass which has been locally treated in this way is less thoroughly heated in the zones near the screens and is therefore less toughened in such zone by abrupt cooling, for instance, by compressed air. Should the glass break, this less toughened zone breaks into larger pieces than the other parts of the glass, as is required.

In a second method of carrying out the invention two screens, for instance, of steel or any other substance, are disposed in a blowing unit (e.g., an air blowing unit) to which the hot glass pane is passed after it has been heated in the furnace. The two screens are respectively disposed opposite each of the glass surfaces and provide local inhibition of abrupt cooling of the glass by air jets from the blowing unit. The cooling air jets are intercepted by the two screens and so there is turbulent air movement between the two screens and the glass. At the place where the greens are disposed, the air streams do not impinge on the glass directly, whereas outside of the two screens the glass is cooled by streams of compressed air impinging directly on both its surfaces.

The screens can be of various kinds, for instance, in the form of an imperforate or perforate plate or of a mesh of varying width. The glass which has been treated locally in this way is less thoroughly cooled in the zone opposite the two screens and is therefore less toughened in the privileged zone, so that the fragmentation thereof is larger than elsewhere in the glass when the same breaks. This zone therefore provides the desired results.

In a third method of carrying out the invention, a perforated box (made of metal or any other heat-resistant substance) is placed in a furnace and is secured opposite a pane of glass to be heated. The box has a supply pipe through which air can be blown at a pressure measured by a presure gauge. The time during which, and the instant at which air is blown into the box, and the air pressure, can be varied. The injected air issues through the apertures in the box and contacts the glass being heated to cool the same locally, so that a zone of larger fragmentation can be produced during toughening. This method can be used with a skeleton-mould bending and gravity-toughening apparatus.

The invention will now be described in more detail, by way of examples, with reference to the accompanying largely diagrammatic drawings, in which.

In a first method employed in accordance with the invent, one or more screens made, for instance, of stainless steel or any other heat-resistance substance, and serving to prevent local heat radiation to the glass is or are introduced into the toughening furnace opposite the glass and near the place where the differentially toughened zone is required. If the screen is made of metal or of any other heat conductor, the screen also serves to remove some heat from the glass, for the preparation of a desired differential zone having relatively large fragmentation depends upon a number of factors as aforesaid.

Glass which has been locally treated in this way is less thoroughly heated in the zones near the or each screen and is therefore less toughened in such zone by abrupt cooling, for instance, by compressed air. Should the glass break, this less toughened zone breaks into larger pieces than the other parts of the glass, as is required.

Figure 1:
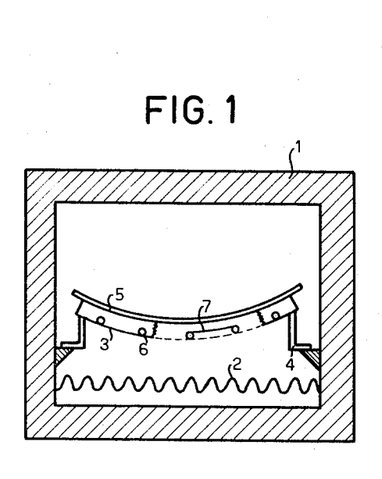
FIGURE 1 shows, in section, a skeleton mould bending apparatus for producing a curved sheet of glass having a privileged zone, in accordance with one embodiment of the invention.
Figure 2:
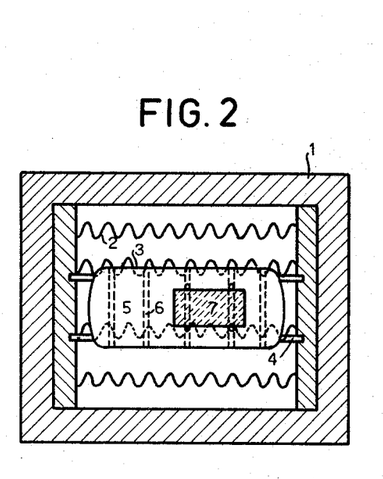
FIGURE 2 is a partly cross-sectional and plan view of the apparatus of FIG. 1.

Referring to FIG. 1, the apparatus comprises a furnace chamber having walls 1 and heated by resistive heating elements 2 arranged along the bottom of the chamber below the level of side supports 4 which carry a skeleton mould 3 provided with strengthening cross-pieces 6 and supporting the weight of a curved glass sheet 5. A stainless steel screen 7 rests on the cross-pieces 6 and blocks off direct radiation from the elements 2 to the portion of the sheet 5 lying in its shadow and subsequently to form the privileged zone.

In use a flat glass sheet is placed on the mould 3 with the screen 7 outside the furnace chamber. The mould 3 is then introduced via a doorway (not shown) into the chamber where the heat from the elements 2 softens the flat pane of glass so that it sags into the arched shape of the mould as shown in FIG. 1, in which a portion of the sheet overlies the screen 7.

The screen 7 serves two purposes:

(a) it removes heat from the glass 5 opposite the screen 7, and
(b) it prevents heat radiation from the elements 2.

When it issues from the furnace, the glass sheet 5 is raised manually or mechanically from the mould 3, whereafter the glass is cooled abruptly by compressed air jets in known manner. This leads to the production of a differentially toughened zone opposite the position of the screen 7 on the mould 3.

Another practical example comprises a device of use in a suspension toughening apparatus. Such device is illustrated in FIG. 3 (in section) and in FIG. 4 (in elevation).

Figure 3:
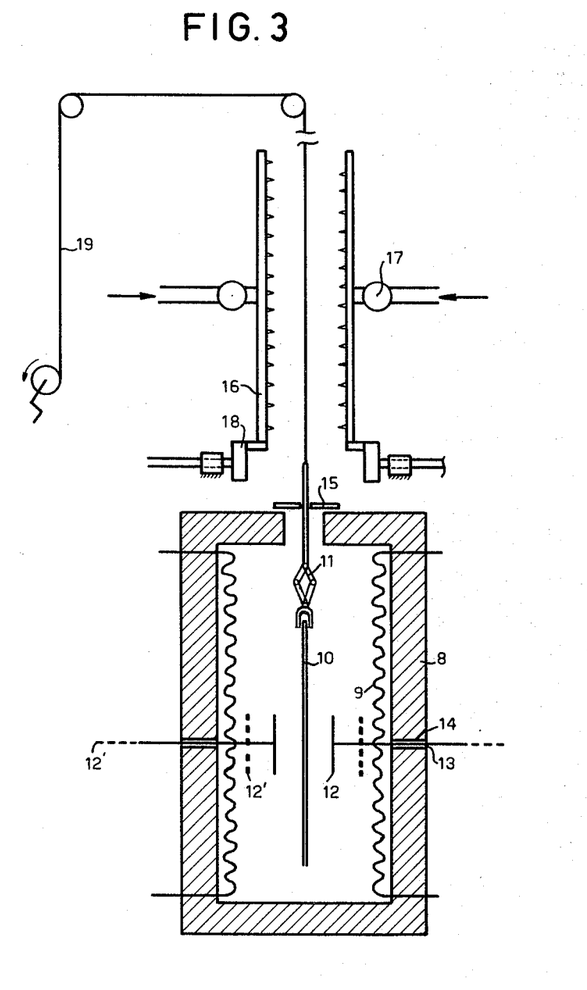
FIGURE 3 is a diagrammatic side view, partly in section, of apparatus for toughening, a suspended sheet of glass and for forming therein a privileged zone.
Figure 4:
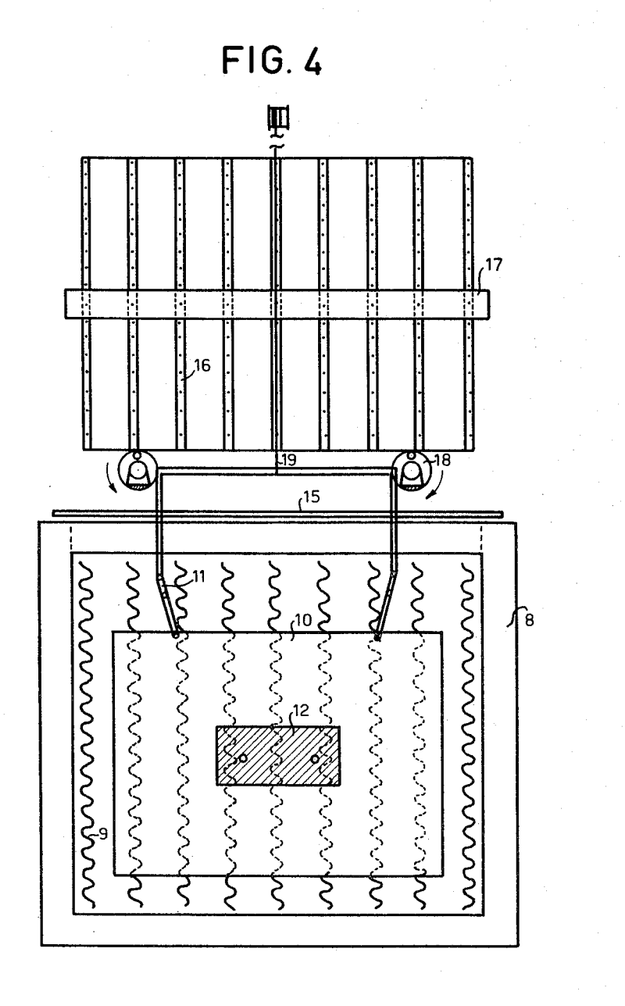
FIGURE 4 is an elevational view of the apparatus in FIG. 3.

In FIGS. 3 and 4 there can be seen furnace walls 8, heating elements 9, and a piece of glass 10 suspended in the furnace by means of grippers 11. Two metal screens 12 disposed at a variable distance from each of the surfaces of the glass 10 and placed exactly opposite one another are secured to cross-pieces 13 slidable in apertures 14 in the furnace walls. The screens 12 prevent local heat radiation from the heating elements 9 or from any heating system in general and also remove heat from the glass 10. Consequently, the two screens can be moved apart and brought to within a few centimetres of the resistors (position 12′) after a predetermined time either manually or pneumatically, for instance, by means of a compressed air cylinder. Alternatively, the two screens 12 can stay in position opposite each of the surfaces of the glass throughout the annealing step. The glass 10, upon leaving the furnace after the door 15 opens, is taken to a blowing element 16 which is supplied with air by an airline 17 and which is moved by an eccentric system 18. The glass is raised by means of a cranking system 19. The glass 10 is then cooled abruptly by streams of compressed air in known manner.

Figure 5:
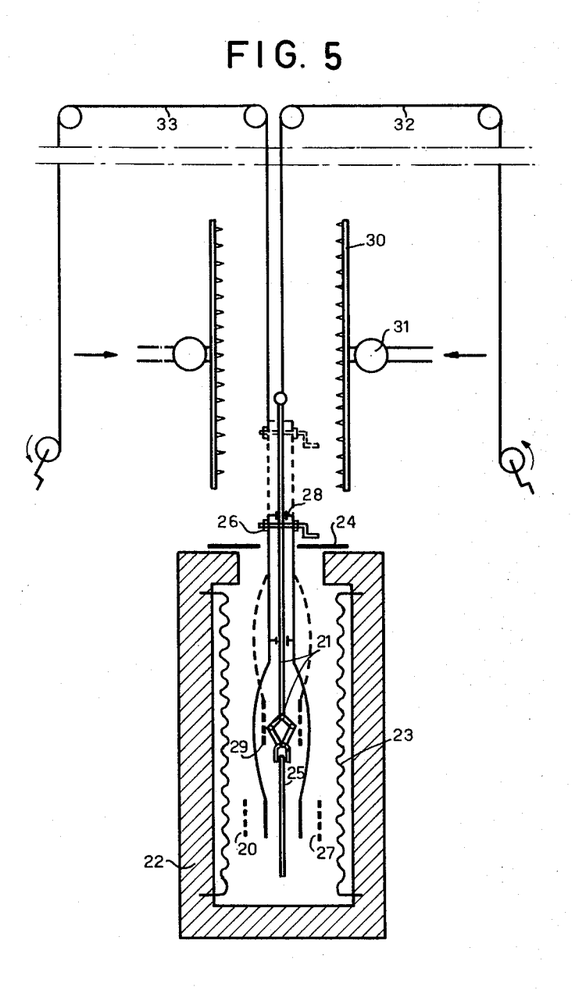
FIGURE 5 is a modified form of the apparatus shown in FIG. 3.
Figure 6:
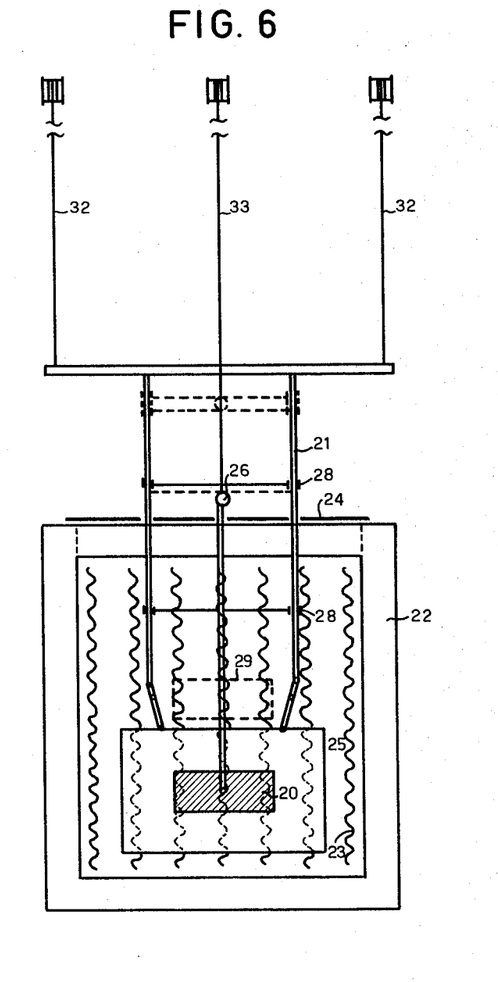
FIGURE 6 is a transverse sectional view of the apparatus in FIG. 5.
Figure 6A:
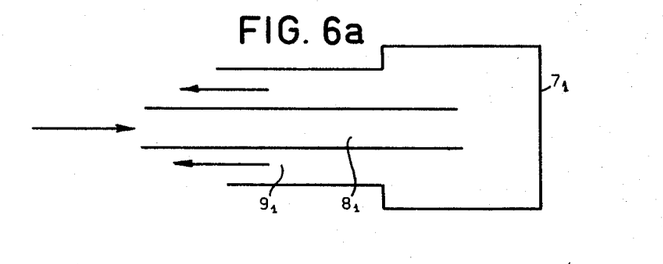
FIGURE 6a is a variant of the apparatus of FIGS. 5 and 6.

In a variant which is diagrammatically illustrated in FIG. 5 in section and in FIG. 6 in elevation, the two metal screens are positioned mechanically opposite each of the surfaces of the glass in the oven. The two screens slide on the rods of the tongs 21 which descend into the furnace formed by walls 22, resistors 23 and a door 24. An adjusting screw 26 is provided to vary the separation between the two screens 20 and the two surfaces of the glass 25 (e.g. position 27). If required, the two screens 20 can slide on the rods of the tongs 21 by means of sliders 28 to retract the two screens relatively to the glass (for instance, position 29) either after a desired dwell time in the furnace or when the glass is raised into the blowing element 30 (not shown in the view in elevation in order to simplify the drawing), with its air supply 31. The system 32 for raising the tongs 21 and the system 33 for raising the screens 20 are independent of one another. In another variant (FIG. 6a), the solid or perforate screen can be replaced by an imperforate box $7^1$ which is supplied by an outer air intake $8^1$ and an exit $9^1$ through an exit pipe. This box acts as screen, but the injected air can vary the thermal capacity of the screen.

In a second method, two screens, for instance, of steel or any other substance, are disposed in the blowing element (e.g. air blowing) opposite each of the glass surfaces and provide local inhibition of over abrupt cooling of the glass. The cooling air streams are intercepted by the two plates or screens or the like, and so there is turbulent air movement between the two screens and the glass. At the place where the screens are disposed, the air streams do not reach the glass directly, whereas outside the two screens the glass is cooled by streams of compressed air on both its surfaces.

The screens can be of various kinds, for instance, in the form of an imperforate or perforate plate or of a mesh of varying width. The glass which has been treated locally in this way is less thoroughly cooled in the zone opposite the two screens and is therefore less toughened in the privileged zone, so that the fragmentation thereof is larger than elsewhere in the glass when the same breaks. This zone therefore provides the desired results.

Figure 7:
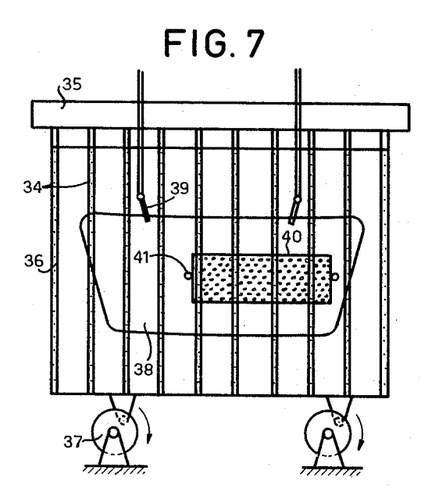
FIGURE 7 shows a side view of a blowing unit having means for producing in a suspended pane of glass a privileged zone in accordance with the invention.
Figure 8:
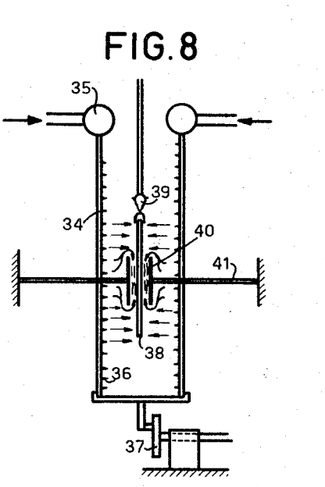
FIGURE 8 is a sectional view of FIG. 7.

The method is of use in a suspension toughening apparatus of the kind illustrated in FIGS. 7 (in elevation) and 8 (in section). There can be seen in diagrammatic form a blowing element having air-flowing pipes 34, supply piping 35 and blowing orifices 36, and the eccentric device 37 for moving the grid. The piece of glass 38 is suspended by means of grippers 39 between two rows of pipes 34 which form the blowing element. Perforate metal screens 40 are secured by means of crosspieces 41 rigidly connected to the chassis of the frame. Each crosspiece 41 passes between two adjacent pipes 34 which are far enough apart from one another to allow the blowing element to rotate. The two screens 40 are placed opposite the glass. At its exit from the furnace the glass is placed in registration with the screens and cooled conventionally. The screens 40 reduce the rapid cooling of the glass in that zone thereof which corresponds to the screens, so that the required differentially toughened zone can be provided.

In the sectional view given in FIG. 8, an embodiment is illustrated by way of example which comprises two screens. If required, however, only a single screen need be provided opposite only one surface of the glass, in which event the perforation of the plates or the mesh of the sieve must be adapted to suit requirements. Another variant is to secure the or each screen directly to the blowing element.

In a third method, a perforate box (made of metal or any other heat-resistant substance) is placed in the toughening furnace and is secured opposite the glass. The box has a supply pipe through which air can be blown at a pressure measured by a pressure gauge. The time during which, and the instant at which, air is blown into the box, and the air pressure, can be varied. The injected air issues through the apertures in the box and contacts the glass to cool the same locally, so that a zone of larger fragmentation can be produced during toughening.

Figure 9:
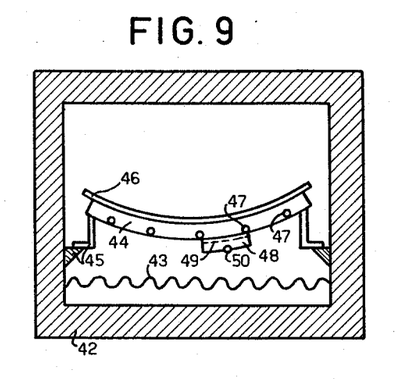
FIGURE 9 shows, partly in section, a modified form of the apparatus of FIG. 1 for carrying out the technique in accordance with the invention.
Figure 10:
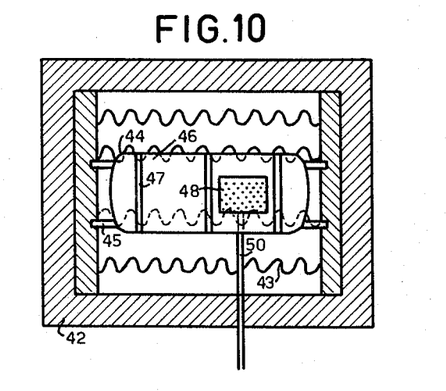
FIGURE 10 is a cross-section of FIG. 9.

The method just described can be carried into practical effect by a skeleton mould gravity toughening apparatus diagrammatically illustrated non-limitatively in FIGS. 9 (in section) and 10 (in plan) in which there can be seen furnace walls 42, heating elements 43, a skelton mould 44, mould supports 45, glass 46 on the mould 44, and crosspieces 47 to keep the mould rigid. A box 48 which is pierced with apertures 49 and which has an air entry 50 is secured to the mould 44, and the same is introduced into the furance 42 with the flat glass and the perforate box 48. During the dwell time of the glass in the furnace, air is injected into the box 48 through the pipe 50 at a pressure which can be checked by a pressure gauge. The air which enters the box 48 departs therefrom through the apertures 49 and thus cools the glass in the required zone to provide the differential toughening. When the mould leaves the furnace, the box 48 is retracted or removed manually or mechanically to allow normal cooling of the glass in the blowing element.

As a variant, two wind boxes 48 can be placed opposite each surface of the glass, the two boxes being disposed exactly opposite to one another.

Figure 11:
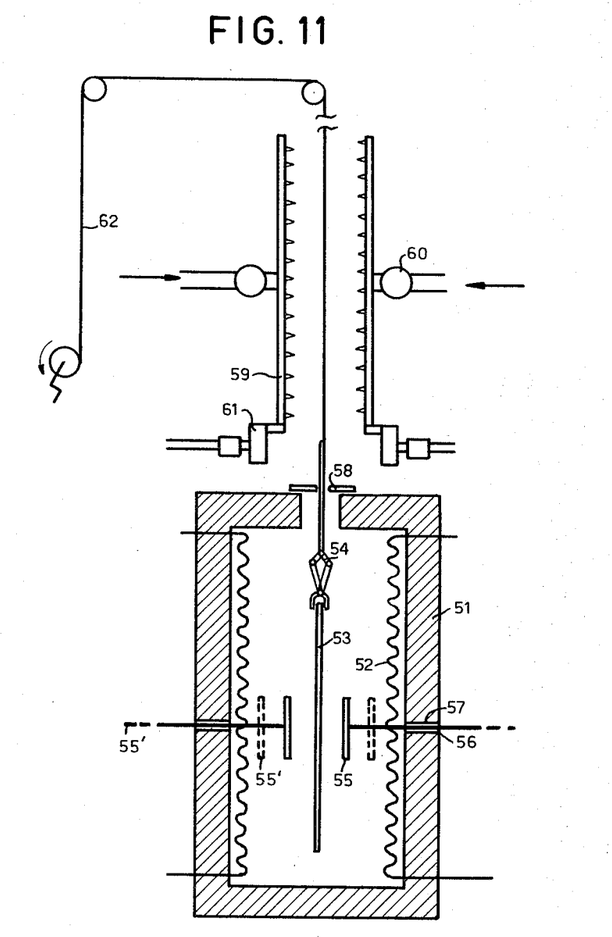
FIGURE 11 shows a modified form of the apparatus illustrated in FIG. 3.
Figure 12:
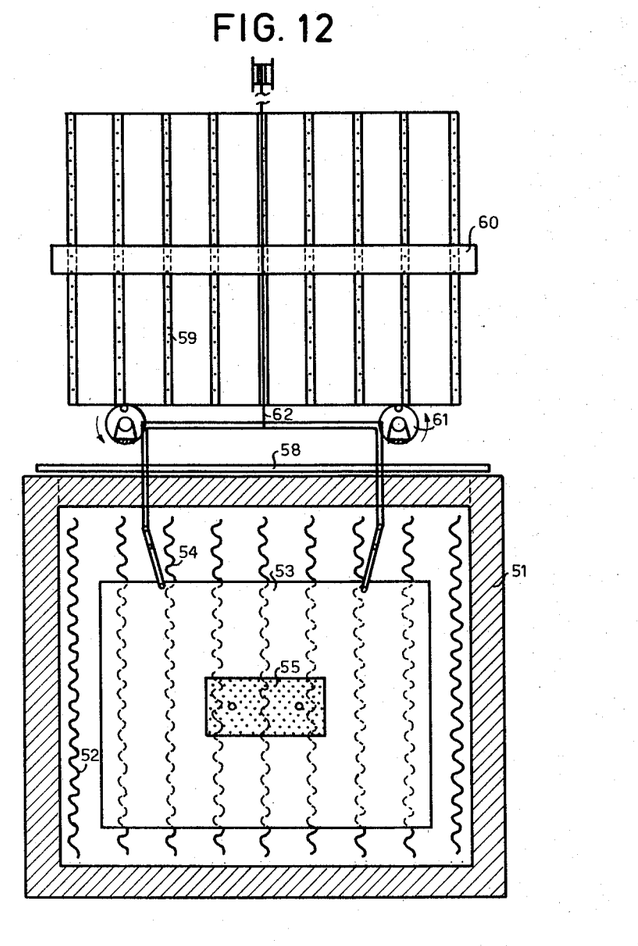
FIGURE 12 is a sectional view of the apparatus of FIG. 11.

Another practical example takes the form of an apparatus for use for suspension toughening and illustrated in FIGS. 11 (in section) and 12 ( in elevation) where there can be seen a suspension furnace including furnace walls 51, heating elements 52, and a piece of glass 53 suspended in the furnace by means of grippers 54. The two perforate boxes 55, which are placed at a variable distance from each of the surfaces of the glass 53, are secured to metal pipes 56 which slide in apertures 57 in the furnace walls 52. Through the pipes 56, which are welded to the perforate boxes 55, air can be injected into the boxes 55 at a pressure measured by a pressure gauge.

The production of any particular toughened zone also depends upon a number of factors (in each of FIGS. 9–12):

(a) The physical characteristics of the substance used for the two perforate boxes—its nature, heat conductivity and so on;

(b) The distance at which the two boxes are placed relatively to the glass;

(c) The diameter and arrangement of the apertures pierced in the two boxes;

(d) The pressure of the injected air, and the instant at which, and time for which, such air is injected, and (e) The shape and dimensions of the boxes.

The air pressure can vary for a single glass during injection. The two perforate boxes must be placed exactly opposite one another. The injected air leaves the boxes through the apertures therein and contacts each of the surfaces of the glass to cool the same locally, so that a relatively large fragmentation zone is produced during the toughening step.

These two perforate boxes perform two jobs:

(a) *Screens:* local inhibition of heat radiation from the elements 52 or any other heating system in general, and removal of heat from the glass 53, and (b) *Cooling devices:* injection of atmospheric air at a desired pressure onto each of the surfaces of glass 53.

After a desired time, the two perforate boxes 55, can be moved apart from one another and brought to within a few centimetres of the resistors 52 (position 55′) either manually or pneumatically. Alternatively, the two boxes 55 can stay in their positions opposite the glass surfaces throughout the annealing process. The glass 53, upon leaving the furnace after the door 58 has been opened, passes to the blowing element 59 which is supplied with air by an air line 60 and which is moved by an eccentric system 62. The glass is raised by means of the crank system 62. The glass 53 is then given abrupt cooling by compressed air jets in known manner.

Figure 13:
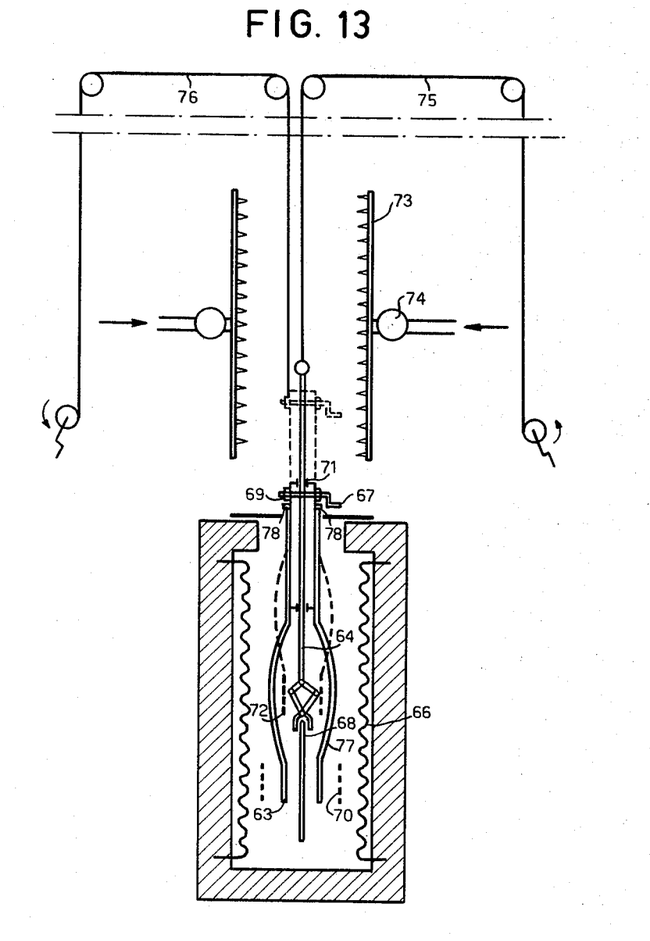
FIGURE 13 shows a modified form of the apparatus illustrated in FIG. 5.
Figure 14:
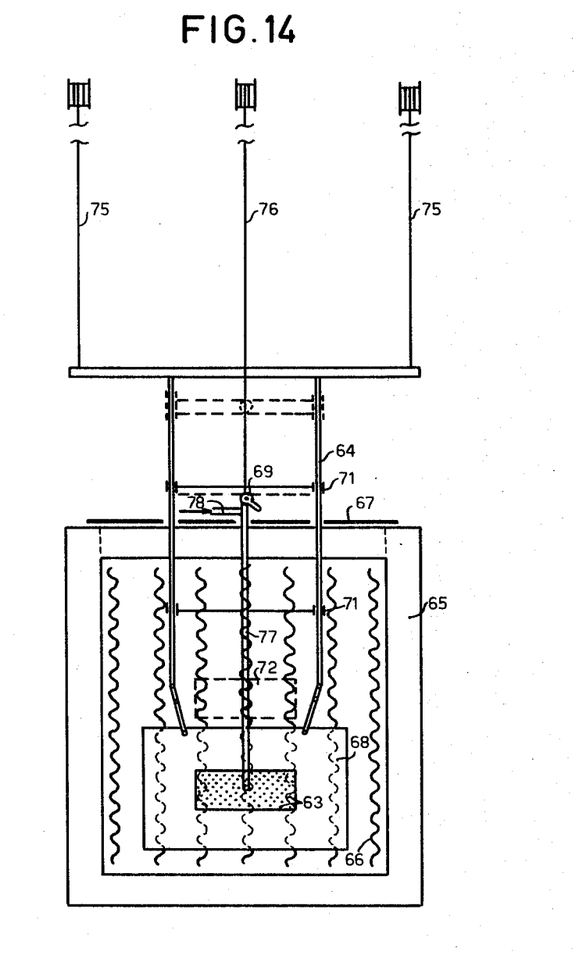
FIGURE 14 is a sectional view of the apparatus of FIG. 13.

In a variant of the method diagrammatically illustrated in FIGS. 13 (in section) and 14 (in elevation), the two perforate boxes are positioned by mechanical means opposite each of the glass surfaces in the furnace. The two perforate boxes 63 slide on the rods of tongs 64 which descend into the furnace formed by walls 65, resistors 66 and a door 67. The two rods 77 which are rigidly secured to the system 76 for raising the perforate boxes 63 are hollow and each welded to its respective box. The metal rods or tubes 77 are formed with a lateral orifice 78 through which atmospheric air is supplied at a pressure measured by a pressure gauge, and for a desired time, to each of the two boxes 63. An adjusting screw 69 is provided to vary the spacing between the two boxes 63 and the two surfaces of the glass 68 (e.g. position 70). If required, the two boxes 63 can slide on the rods of the tongs 64 by means of sliders 71 to retract the two boxes 63 relatively to the glass (e.g. position 72) either after a desired dwell time in the furnace or when the glass is raised into the blowing element 73 (not shown in FIG. 14 in order not to complicate the drawing) which has an air supply device 74. The system 75 for raising the tongs 64, and system 76 for raising the boxes 63, are independent of one another.

In a fourth method, two or more of the methods hereinbefore described are combined—i.e., one or more devices combining the effects provided by two or more of such methods. As a practical and non-limitative example, the perforate screen secured below the skelton mould is not withdrawn when the glass is given the abrupt cooling treatment in the blowing element. In this event the differentially toughened zone results from the combination of the effects of the screen in the furnace (1st method: inhibition of local heat radiation to the glass) and from the retarding action which such screen has on the air streams in the blowing element (2nd method). A single apparatus can therefore be used to replace the apparatus for carrying into effect the methods described in A and B.

Another practical example is to combine two of the above methods—i.e., the two perforate boxes each having its air supply pipe are borne in the suspension furnace by the tongs which descend thereinto. These two perforate boxes are placed opposite each of the surfaces of the glass and exactly opposite one another. During annealing atmospheric air is supplied at a desired pressure and for a desired time to each of the perforate boxes. When the glass leaves the furnace, injection of air into the boxes ceases and the tongs bearing the glass and the perforate boxes are raised into the blowing element. When the glass is given the abrupt cooling treatment, the two perforate boxes act as screens which retard the air streams.

Another practical example is to combine two of the above methods but for gravity toughening. Accordingly, a perforate box is secured to the skeleton mould inside the furnace and is supplied with atmospheric air. The glass is therefore cooled locally during its dwell in the furnace. When the mould leaves the furnace, the box is retracted or removed either manually or mechanically, and the mould enters the blowing element where the screens are disposed (e.g. stainless-steel sieves) to retard the air streams during the abrupt cooling of the glass, so that the two effects can be combined. A differentially toughened zone is provided in this way.

Of course, the invention is not limited to the embodiments described and illustrated in the drawings but can be embodied in many other ways all falling under the scope of this invention.

What I claim is:

1. Apparatus for the manufacture of objects of tempered glass comprising an annealing furnace including walls, heating elements arranged alongside the walls, means whereby a sheet of glass is adapted to be suspended in the furnace and held along its upper edge, means to raise the glass sheet from the furnace and to introduce into the furnace a blowing unit mounted above the furnace and into which the heated sheet is directly lifted as the sheet is raised from the furnace, the said blowing unit comprising two grids provided with air nozzles, means to supply air to said nozzles, means to move the blowing unit in its own plane so that air jets on the unit follow an orbital path while blowing cooling air onto the surface of the glass, two perforated wind boxes in the annealing furnace placed at a variable distance from each of the surfaces of the glass sheet, air supply pipes in communication with boxes to supply air thereto to cause air to be ejected from the box and contact the glass being heated to cool the same locally.

2. Apparatus for differentially tempering a glass sheet to provide first and second distinct differentially tempered zones in the sheet constituted by a first inner zone of relatively low temper and a second outer zone surrounding the inner zone and of relatively high temper, said apparatus comprising: a furnace, first means for supporting a glass sheet in the furnace, heating means in the furnace for applying heat to the glass sheet, a cooling chamber, second means for displacing the glass sheet from the furnace to the cooling chamber, third means movable between the furnace and cooling chamber for respectively inhibiting the application of heat on the first zone of said sheet in the furnace and inhibiting cooling of said first zone of said sheet in the cooling chamber, and means supporting the third means for displacement with respect to the sheet to permit adjustment of the position of said third means with respect to said sheet both as to proximity as well as orientation, said first means being a tongs device which engages said sheet and is displaceable between said furnace and said cooling chamber, said third means comprising a support member slidably displaceable on said tongs device, and a pair of members on said support member respectively located on either side of the glass sheet for inhibiting the application of heat on the first zone of said sheet in the furnace and inhibiting cooling of said first zone of said sheet in the cooling chamber, said upper member and said tongs device being coaxial and the latter being contained within the support member, said members on the support member being perforate boxes, said support member including hollow rods in communication with the perforate boxes and nozzles on said rods for the inlet of air to said boxes.

References Cited by the Examiner

UNITED STATES PATENTS

| 2,167,294 | 7/1939 | Despret | 65—114 |
| 2,177,324 | 10/1939 | Long | 65—115 |
| 2,298,709 | 10/1942 | Long | 65—348 |
| 2,553,945 | 5/1951 | Schrader | 65—349 |
| 3,119,680 | 1/1964 | Do Huu Chan et al. | 65—349 |
| 3,216,814 | 11/1965 | Shaffer | 65—288 |

FOREIGN PATENTS 210,894  10/1957  Australia.

DONALL H. SYLVESTER, *Primary Examiner.*

A. D. KELLOGG, *Examiner.*